United States Patent
Scharf et al.

(10) Patent No.: US 8,808,610 B2
(45) Date of Patent: Aug. 19, 2014

(54) SYSTEMS AND METHODS FOR COOLING MOVING MOLDS

(76) Inventors: Patrick E. Scharf, Marion, OH (US); Randy A. Kolbet, Liberty Township, OH (US); Robin Lavereau, Victoria Harbour (CA); Konrad Benkovski, Midland (CA); Michael Millward, Midland (CA); Robert Sheppard, Penetanguishene (CA)

( * ) Notice: Subject to any disclaimer, the term of this patent is extended or adjusted under 35 U.S.C. 154(b) by 339 days.

(21) Appl. No.: 12/416,647

(22) Filed: Apr. 1, 2009

(65) Prior Publication Data
US 2010/0252963 A1 Oct. 7, 2010

(51) Int. Cl.
*B29C 51/10* (2006.01)

(52) U.S. Cl.
USPC ............... 264/505; 264/540; 264/571

(58) Field of Classification Search
None
See application file for complete search history.

(56) References Cited

U.S. PATENT DOCUMENTS

| | | | |
|---|---|---|---|
| 3,776,679 A | 12/1973 | Hegler | |
| 4,492,551 A | 1/1985 | Hegler et al. | |
| 5,059,109 A * | 10/1991 | Dickhut et al. | 425/233 |
| 5,489,201 A | 2/1996 | Berns et al. | |
| 5,494,430 A | 2/1996 | Berns et al. | |
| 5,531,583 A * | 7/1996 | Berns et al. | 425/193 |
| 5,645,871 A | 7/1997 | Berns et al. | |
| 6,460,598 B1 * | 10/2002 | Adams et al. | 164/98 |
| 6,652,258 B1 | 11/2003 | Starita | |
| 6,773,253 B2 | 8/2004 | Hegler | |
| 7,306,448 B2 | 12/2007 | Neubauer et al. | |
| 2003/0072837 A1 | 4/2003 | Hegler | |
| 2004/0113327 A1 | 6/2004 | Starita | |

FOREIGN PATENT DOCUMENTS

| | | |
|---|---|---|
| EP | 0 621 120 A2 | 4/1994 |
| JP | 59111821 | 6/1984 |

\* cited by examiner

*Primary Examiner* — Monica Huson
(74) *Attorney, Agent, or Firm* — Finnegan Henderson Farabow Garrett & Dunner, L.L.P.

(57) ABSTRACT

A mold cooling system is provided for cooling a polymer product shaped in a mold. The mold cooling system includes a moving manifold having a cooling fluid supply and a cooling fluid return; and a mold housing having a mold surface that defines a cavity. The mold housing has a connector configured to receive the cooling fluid supply and cooling fluid return of the moving manifold; and a passageway that extends through the mold housing adjacent to the mold surface, the passageway connecting the cooling fluid supply and the cooling fluid return when the moving manifold is received in the connector. A method is also provided for cooling an extruded, blow-molded product before the product is released from a mold.

14 Claims, 6 Drawing Sheets

SYSTEMS AND METHODS FOR COOLING MOVING MOLDS

TECHNICAL FIELD

The present disclosure relates to cooling moving mold systems, and more particularly, to systems and methods for cooling moving molds used in manufacturing corrugated polymer pipe.

BACKGROUND OF THE DISCLOSURE

In continuously extruded blow-molding processes, a hollow tube of melted polymer, or "parison," is typically extruded through an annular die and into a moving mold. As the parison enters the moving mold, the parison is expanded with pressurized air or gas to force the parison into the shape of the mold. In some cases, a vacuum is also applied to the cavity within the mold to draw the parison against the interior walls of the mold. As the molten parison takes the hollow shape of the mold, and travels with the mold away from the hot extruder, the mold, the polymer, and any air or gas within the hollow center of the molded polymer begins to cool.

Variations of such continuous extrusion blow-molding processes may be used to manufacture corrugated polymer pipe. For example, corrugated polymer drainage pipe may be co-extruded from molten polyethylene and/or polypropylene and blow-molded into a desired profile. One method of manufacturing polymer pipe involves co-extruding a smooth inner layer and a corrugated outer layer of pipe into moving molds of a corrugator. The two layers of polymer are generally extruded at a temperature sufficiently high to allow them to conform to the inner corrugated cavity of the mold and properly bond with each other, as desired, depending on the particular composition of polymer. Specifically, the extruded layers of polymer are extruded at a temperature hot enough to melt both layers of the polymer, such that polymer chains of the two layers intersperse and then cool together. This results in the smooth inner wall and the corrugated wall being integrally fused or bonded together wherever they contact each other.

When manufacturing large diameter corrugated pipe, the extruded polymer layers may be disposed inside the molds of a corrugator or vacuum chamber for a period of time (i.e., "residence time") during which a substantial amount of cooling is desired. Specifically, the layers of polymer are desired to be cooled to a temperature at which they are no longer susceptible to substantial deformation, even when the molds of the corrugator are opened. Previous attempts at cooling the molds of a corrugator have been complicated, unreliable, and, in some cases, have interfered with vacuum mechanisms used to blow-mold the polymer layers into the mold cavities. Moreover, previous attempts at cooling the molds have been unable to efficiently provide a sufficient level of heat transfer to cool the mold housing, mold cavity, and polymer therein to an acceptable temperature. In some instances, these limitations have constrained the rate at which products are manufactured.

Accordingly, there is a need for systems and methods for cooling moving molds used in manufacturing corrugated polymer pipe.

SUMMARY OF THE DISCLOSURE

It is an object of the present disclosure to provide such systems and methods for cooling moving molds used in manufacturing corrugated polymer pipe.

One exemplary embodiment of the present disclosure provides a mold cooling system for cooling a polymer product shaped in a mold. The mold cooling system includes a moving manifold having a cooling fluid supply and a cooling fluid return; and a mold housing having a mold surface that defines a cavity. The mold housing has a connector configured to receive the cooling fluid supply and cooling fluid return of the moving manifold; and a passageway that extends through the mold housing adjacent to the mold surface, the passageway connecting the cooling fluid supply and the cooling fluid return when the moving manifold is received in the connector.

Another exemplary embodiment of the present disclosure provides a mold for shaping a continuously-extruded parison into a hollow plastic product. The mold includes an exterior surface defining a mold housing and an interior surface defining a mold cavity. The mold also includes a connector configured to receive a cooling fluid supply and a cooling fluid return of a moving manifold. The mold also includes a passageway that extends through the mold housing adjacent to the interior surface, the passageway connecting the cooling fluid supply and the cooling fluid return when the moving manifold is received in the connector.

Yet another exemplary embodiment of the present disclosure provides a method of cooling an extruded, blow-molded product before the product is released from a mold. The method includes the steps of: extruding a parison from a die head; and urging the parison to expand into the mold to form a hollow product. The method also includes inserting a cooling fluid supply into a connector of the mold; flowing a cooling fluid through a passageway cast into the mold; and removing the cooling fluid from the mold through the connector after the cooling fluid has absorbed heat energy from the mold.

In this respect, before explaining at least one embodiment of the disclosure in detail, it is to be understood that the invention is not limited in its application to the details of construction and to the arrangements of the components set forth in the following description or illustrated in the drawings. The invention is capable of embodiments in addition to those described herein and of being practiced and carried out in various ways. Also, it is to be understood that the phraseology and terminology employed herein, as well as the abstract, are for the purpose of description and should not be regarded as limiting.

The accompanying drawings illustrate certain exemplary embodiments of the present disclosure, and together with the description, serve to explain the principles of the invention.

As such, those skilled in the art will appreciate that the conception upon which this disclosure is based may readily be utilized as a basis for designing other structures, methods, and systems for carrying out the several purposes of the present disclosure. It is important, therefore, to recognize that the claims should be regarded as including such equivalent constructions insofar as they do not depart from the spirit and scope of the present disclosure.

DESCRIPTION OF THE EXEMPLARY EMBODIMENTS

Reference will now be made in detail to the exemplary embodiments of the disclosure described above and illustrated in the accompanying drawings.

Figure 1:
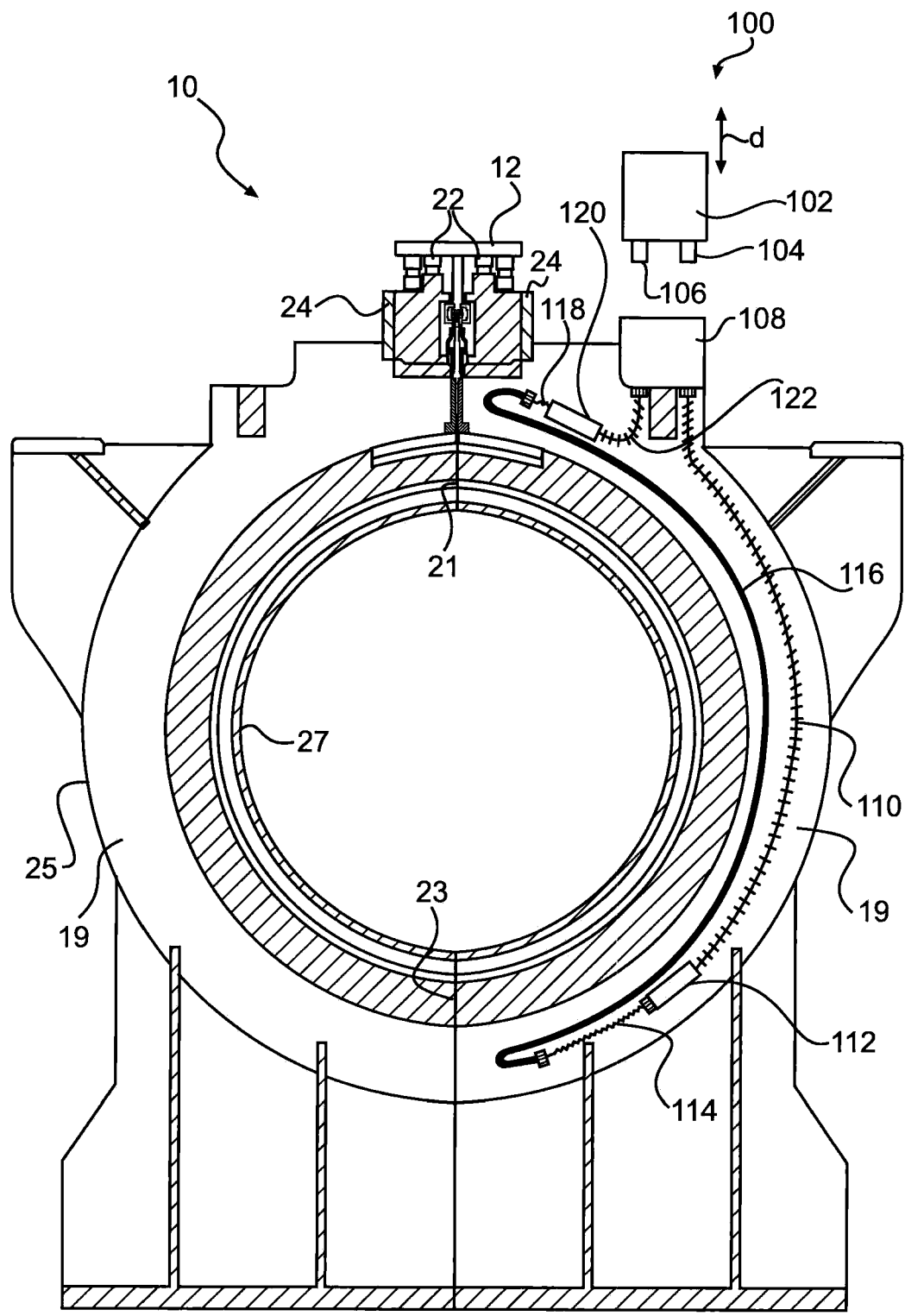
FIG. 1 is a cross-sectional front view of an exemplary moving mold system, consistent with embodiments of the present disclosure.

FIG. 1 illustrates an exemplary embodiment of a moving mold system 10. Moving mold system 10 may include a mold track 12 and a pair of mold halves 19. Each mold half 19 may be provided with a mold track follower 22 and a rack gear 24, which allow each mold half 19 to be propelled by a pinion or other gear along the mold track 12, as guided by the mold track followers 22. In one embodiment, each mold half 19 may have a mold track follower 22 disposed at each end of a rack gear 24. Thus, mold halves 19 may be configured to move along the mold track 12, as guided by mold track followers 22. For example, the mold track 12 may extend from an extruder (not shown) to a distal location, such that mold halves 19 may move away from the extruder. In one embodiment, a plurality of sets of mold halves 19 may be disposed adjacent to each other along the mold track 12, each set of mold halves 19 being configured to translate along the mold track 12 away from an extruder.

In one embodiment, mold halves 19 may include two opposing semi-circular mold halves that, when mated with each other, form an annular mold suitable for forming a section of annular corrugated pipe. For example, each mold half 19 may be selectively joined with an opposing mold half 19 along an upper mating face 21 and a lower mating face 23. In this embodiment, the two mold halves 19 may have their respective mating faces 21, 23 joined along a "parting line," which runs vertically through a central plane that intersects the mold track 12. When the two mold halves 19 are joined together, the mold may have an exterior surface 25 that substantially defines a housing of the mold, as well as an interior surface 27 that defines a cavity of the mold. As will be described in more detail below, in one embodiment, interior surface 27 may define a pipe profile, including a plurality of corrugations having alternating annular crest portions and valley portions. One of skill in the art will appreciate that interior surface 27 may define any geometrical profile into which a polymer product is desired to be blow-molded and shaped.

As depicted in FIG. 1, moving mold system 10 may be provided with a cooling system 100. Because polymer may be extruded into moving mold system 10 at a relatively high temperature (i.e., sufficient to melt and deform the polymer), it may be desired to cool mold halves 19 such that polymer recently blow-molded against interior surface 27 may be cooled at a higher rate than it would if allowed to cool without the use of additional cooling fluid. Thus, cooling system 100 may be configured to remove heat from mold halves 19 in an efficient manner. Although FIG. 1 only depicts cooling system 100 on one side of mold halves 19, it will be appreciated that a similar cooling system 100 may be provided for each one of the mold halves 19 in moving mold system 10.

Cooling system 100 may include a moving manifold 102, which is configured to move both vertically in direction, d, and laterally, in the direction of the moving mold halves 19. For example, both mold halves 19 and moving manifold 102 may be configured to move parallel to a direction of manufacture, along a central axis of polymer pipe being formed by the moving mold halves 19. Moving manifold 102 may be referred to in various related arts as a "milker." Moving manifold 102 may be provided with a cold fluid supply 104 and a warm fluid return 106 for conveying cooling fluid to and from mold halves 19. The cold fluid supply 104 and warm fluid return 106 of moving manifold 102 may be disposed in a closed loop and/or in communication with a supply tank, a pump, a heat exchanger, a sump, and/or a filter.

The cooling fluid may be any suitable type or combination of heat transfer fluids, including gases such as air, hydrogen, helium, nitrogen, carbon dioxide, sulfur hexafluoride, steam, and/or various inert gases. The cooling fluid may also or alternatively include any type or combination of liquids, such as water, ethylene glycol, diethylene glycol, propylene glycol, mineral oil, castor oil, silicone oil, fluorocarbon oils, liquid fusible alloys, freons, refrigerants, liquid gases, or any other heat exchanging fluid. Of course, it will be appreciated that any other type or combination of fluids suitable for collecting heat energy and cooling hot molds may be incorporated into the systems and methods described herein.

As shown in FIG. 1, moving manifold 102 may be configured to engage a quick-connect 108 associated with each mold half 19. Specifically, the cold fluid supply 104 of moving manifold 102 may be configured to communicate with a cold supply hose 110 connected to quick-connect 108. Similarly, the warm fluid return 106 of moving manifold 102 may be configured to communicate with a warm return hose 122 also connected to quick-connect 108. Even though hose 110 is described herein as a cold supply hose and hose 122 is described as a warm return hose, it will be appreciated that the two components may be switched, such that cold fluid is supplied through hose 122 and warm fluid is returned through hose 110.

In one embodiment, cold supply hose 110 may be a ¾" hose that runs around a mold half 19 between quick-connect 108 and a multi-manifold 112. Multi-manifold 112 may be a splitting manifold (e.g., one-to-two, one-to-three, or one-to four) which divides a flow of cooling fluid from the cold supply hose 110 into a plurality of cold supply hoses 114. Each of the cold supply hoses 114 may connect to a cooling tube 116. In one embodiment, each multi-manifold 112 may be connected to three cold supply hoses 114, and each of the cold supply hoses 114 may be connected to one of three cooling tubes 116.

In one embodiment, cooling tubes 116 may be stainless steel tubes that are cast into the housing of mold half 19. For example, each of the cooling tubes 116 may include stainless steel tubing positioned in a casting form, into which the mold may be formed by casting molten metal, such as aluminum or alloys thereof. Of course, cooling tubes 116 may be embedded or encapsulated into mold half 19 by any other suitable method. In one embodiment, each of the cooling tubes 116 may be cast into the mold half 19 at a location and orientation selected to improve cooling of polymer molded into the interior surface 27 of the mold half. For instance, as will be described in more detail with respect to FIG. 4, each of the cooling tubes 116 may be cast into the mold half 19 adjacent to interior surface 27. More specifically, each of the cooling tubes 116 may be positioned relative to one or more corrugations formed in the interior surface 27. In one embodiment, each cooling tube 116 may extend from one of the cold supply hoses 114 near the bottom of a mold half 19, continue around one or more corrugations formed in the interior surface 27 of the mold half 19, and connect to one of a plurality of warm return hoses 118 disposed near the top of the mold half 19. Each of the warm return hoses 118 may extend between a respective cooling tube 116 and a multi-manifold 120 disposed near the top of the mold half 19. Multi-manifold 120 may be a splitting manifold (e.g., one-to-two, one-to-three, or one-to four) which combines the flow from several warm return hoses 118 into a single warm return hose 122. Warm return hose 122 may connect the multi-manifold 120 to the quick-connect 108. Of course, the cooling fluid may travel in an opposite direction, in which case the positions of the cold supply hose 110 and warm return hose 122 may be switched.

Thus, the above-referenced conduits may provide a passageway through which cold cooling fluid may enter mold half 19 from cold fluid supply 104, extend along an interior surface 27 of the mold half 19, and exit the mold half 19 at warm fluid return 106. As described above, cold cooling fluid may travel through cooling tubes 116 starting from the bottom of a mold half 19, or starting from the top of a mold half 19. Moreover, cooling fluid may flow through adjacent cooling tubes 116 in opposite, or alternating directions. In one embodiment, the cooling fluid may expend a majority of its heat capacity as it travels through cooling tubes 116 along one or more formations in the interior surface 27 of the mold half 19. Cooling tubes 116 may be made from stainless steel tubing, or any other metal or metal alloy tubing having high heat conductivity. Thus, in one embodiment, while the cold supply hose 110, cold supply hoses 114, warm return hose 122, and warm return hoses 118 may be flexible hoses relatively loosely disposed around the mold halves 19, the cooling tubes 116 may be fixedly cast into the mold housing in a desired orientation.

Figure 2:
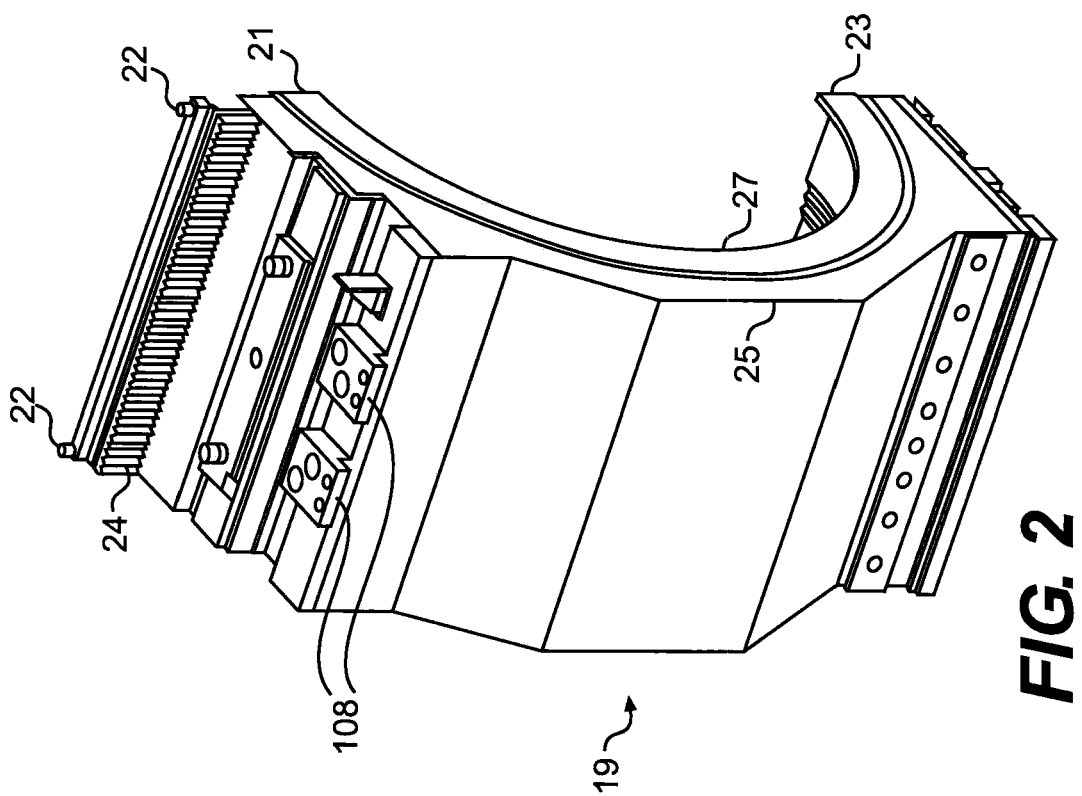
FIG. 2 is a perspective view of one of the mold halves of the moving mold system depicted in FIG. 1, consistent with embodiments of the present disclosure.

FIG. 2 depicts a perspective view of an exemplary mold half 19. As described with respect to FIG. 1, mold half 19 may include an exterior surface 25 that defines a mold housing, and an interior surface 27 that defines a mold cavity. Mold half 19 may further include a set of upper and lower mating faces 21, 23. Mold half 19 may further be provided with a plurality of mold track followers 22 and a rack gear 24 configured for use in propelling mold half 19 in a direction of manufacture. Mold half 19 may further include a plurality of quick connects 108 for conveying cooling fluid to and from mold half 19. In the embodiment depicted in FIG. 2, mold half 19 may include two quick connects 108; however, it will be appreciated that any number of quick connects 108 may be incorporated into each mold half 19. Each quick connect 108 may be provided to receive a cold fluid supply 104 and warm fluid return 106 of one or more moving manifolds 102 associated with cooling system 100.

Figure 3:
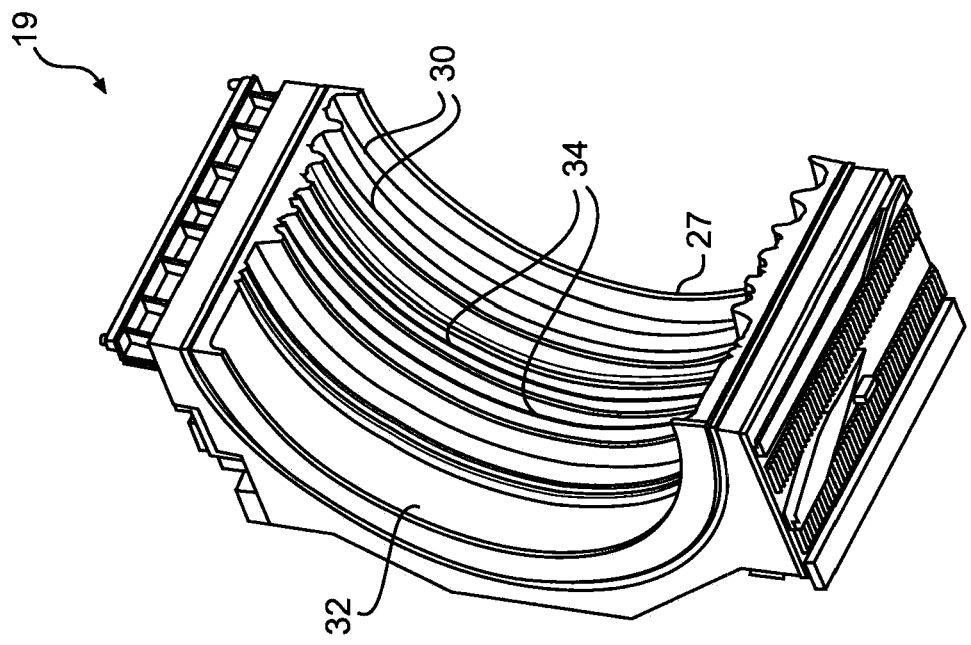
FIG. 3 is another perspective view of the mold half depicted in FIG. 2, consistent with embodiments of the present disclosure.

FIG. 3 depicts an alternative perspective view of the exemplary mold half 19. Specifically FIG. 3 depicts a view of the mold cavity in which a polymer product may be blow-molded. It will be appreciated that virtually any profile may be machined into the interior surface 27 of mold halves 19. However, in the embodiment disclosed herein, the mold cavity of mold half 19 may include a profile designed to form corrugations in a polymer drainage pipe. Specifically, as shown in the embodiment of FIG. 3, the interior surface of mold half 19 may be provided with a profile designed to form a bell and spigot portion of a corrugated polymer drainage pipe. For this portion of pipe, the profile may include a plurality of standard corrugations 30 having alternating annular crests and valleys. The profile may further include a plurality of smaller corrugations 34 having smaller alternating annular crests and valleys, which may be formed into a spigot portion of a blow-molded polymer drainage pipe. The profile may further include a relatively smooth, expanded portion 32, which may be formed into a bell portion of the blow-molded polymer drainage pipe. In order to make a middle section of corrugated pipe, the profile may include a plurality of standard corrugations 30 having alternating annular crests and valleys. For example, each mold half 19 may be provided with approximately six to ten annular corrugations 30, depending on the type and diameter of polymer drainage pipe formed therein.

Figure 4:
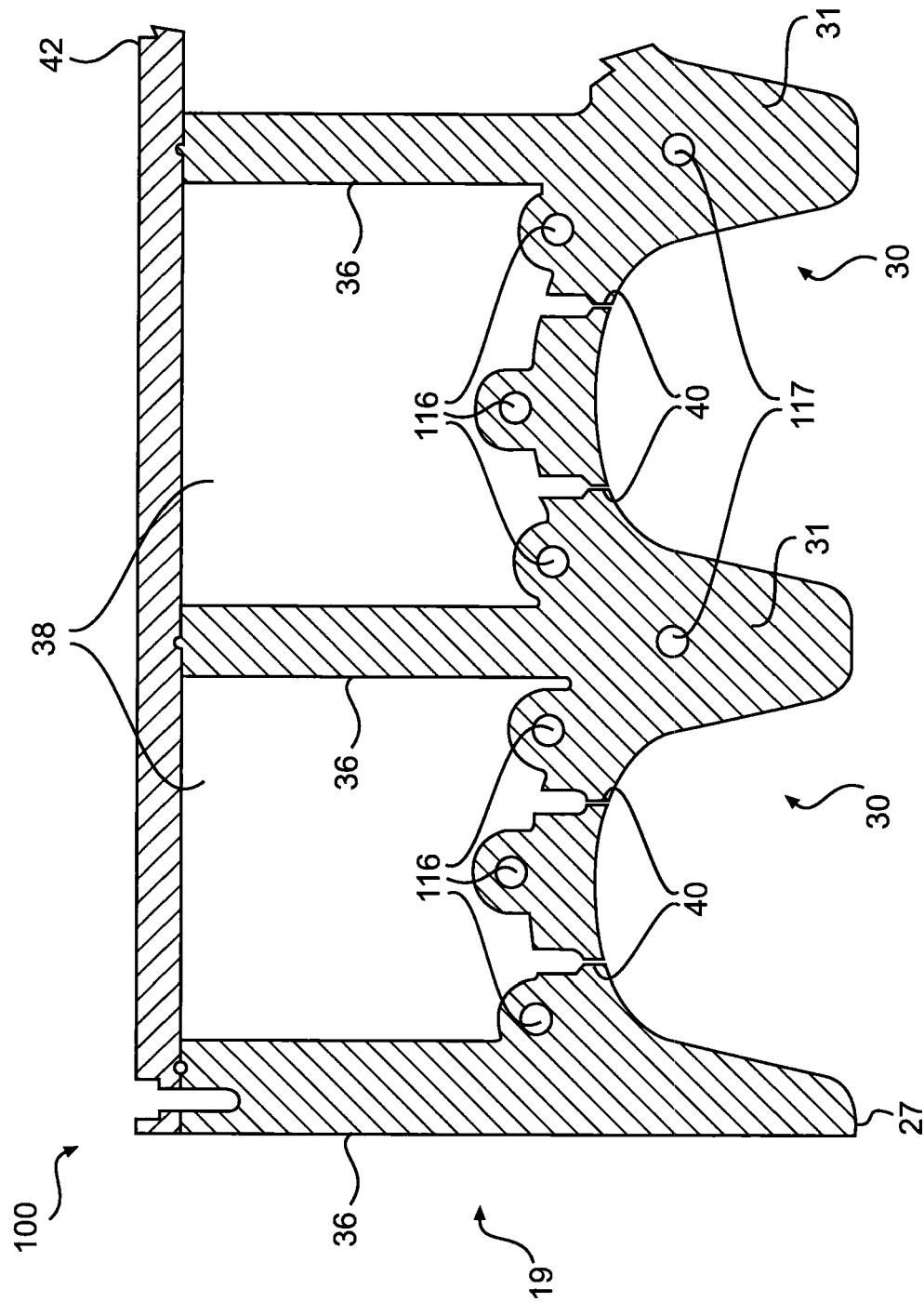
FIG. 4 is a partial, cross-sectional side view of the corrugations and cooling system of an exemplary mold half, consistent with embodiments of the present disclosure.

FIG. 4 illustrates a partial cross-section of an exemplary mold cooling system 100 consistent with the embodiments of FIGS. 1-3. Specifically, FIG. 4 depicts the cross-section of only two corrugations 30 of an exemplary mold half 19. Each of the corrugations 30 may at least partially define the geometry of the interior surface 27 of the mold half 19. Each mold half 19 may include a plurality of vertical webs 36 extending away from the interior surface 27 of the mold half 19. For example, as shown in FIG. 4, each corrugation 30 may have a vertical web disposed on each side of the corrugation 30 (i.e., axially in front of, and behind, each annular corrugation 30). Each mold half 19 may further include a plurality of sealing plates 42 configured to be mounted to the vertical webs 36, thereby forming a plurality of vacuum chambers 38. Each vacuum chamber 38 may be provided in fluid communication with a corresponding corrugation 30 via one or more vacuum slots 40 formed in the top of the corrugation 30. Thus, each vacuum chamber 38 may be configured to selectively draw a vacuum on a corrugation 30, in order to facilitate blow-molding a parison against the interior surface 27 of the mold half 19. In some embodiments, each of the vacuum slots 40 may be provided in communication with vacuum tubing running between vertical webs 36, which may reduce an amount of vacuum space drawn against by a vacuum pump, compared to the use of the entire vacuum chambers 38.

As described above with respect to FIG. 1, each mold half 19 may be provided with a plurality of cooling tubes 116 cast into, and around, the mold half 19 and adjacent to an interior surface 37. As shown in the embodiment of FIG. 4, each corrugation 30 of the mold half 19 may have approximately three cooling tubes 116 positioned behind a crest portion of the corrugation 30. The three cooling tubes 116 may include stainless steel tubing cast into the mold housing, between two adjacent vertical webs 36, and just behind the mold surface into which molten polymer is formed. The three cooling tubes 116 may be positioned apart from each other, and from the mold surface, by distances defined by the rate and amount of heat transfer desired at the mold surface. The temperature and flow rate of the cooling fluid through cooling tubes 116 may also be defined by the rate and amount of heat transfer desired at the mold surface. As shown in FIG. 4, each of the two vacuum slots 40 associated with a corrugation 30 may be disposed alternatingly between the three cooling tubes 116. However, it will be appreciated that vacuum slots 40 may be provided in any orientation around each corrugation 30, including any locations around the valleys, sidewalls, and crests of each corrugation 30.

As shown in FIG. 4, additional cooling tubes 117 may also be cast into the mold housing at various locations where additional cooling is desired. For example, cooling tubes 117 may be cast into the mold between corrugations 30, adjacent to the valleys 31 of the mold. Even though only one cooling tube 117 is depicted between each corrugation 30, it will be appreciated that any number and orientation of additional cooling tubes 117 may be cast into the mold to provide additional cooling, as desired.

Figure 5:
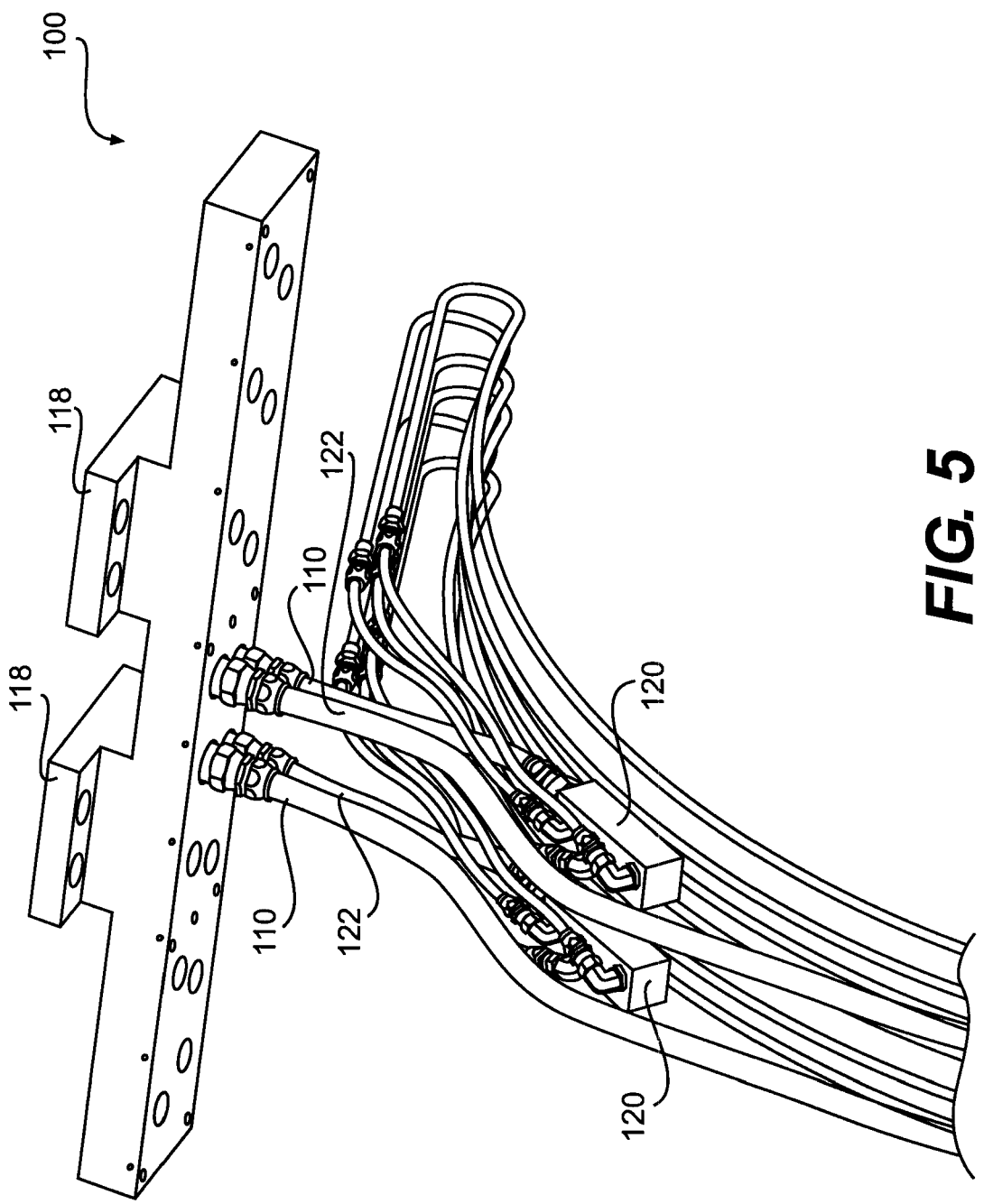
FIG. 5 is a partial, perspective view of an exemplary cooling system, consistent with embodiments of the present disclosure.

FIG. 5 illustrates a partial perspective view of an exemplary cooling system 100 for two adjacent corrugations associated with two adjacent quick-connects 118. A first corrugation may be provided with a cold supply hose 110 that extends from a quick-connect 118 to an opposite end of a mold half, and a warm return hose 122 that extends from the quick-connect 118 to a multi-manifold 120 at the same end of the mold half, as described above. An adjacent corrugation may be provided with a cold supply hose 110 that extends from an adjacent quick-connect 118 to a multi-manifold 120, and a warm return hose 122 that extends from the adjacent quick-connect 118 to an opposite end of the mold half. Thus, adjacent corrugations may be provided with cooling fluid traveling in opposite directions along the mold half 19.

Figure 6:
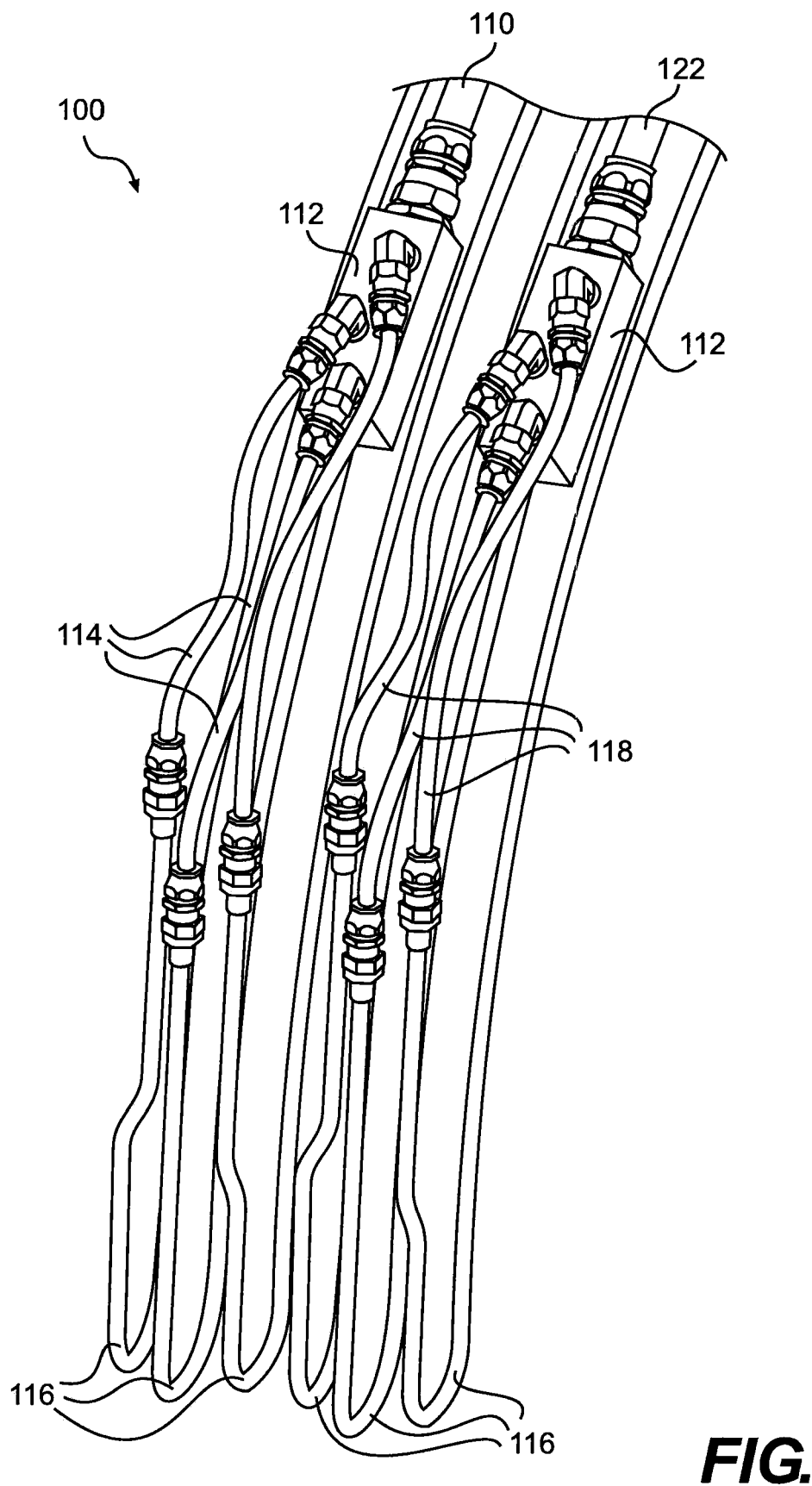
FIG. 6 is another partial, perspective view of an exemplary cooling system, consistent with embodiments of the present disclosure.

FIG. 6 illustrates a partial perspective view of the exemplary cold supply hose 110 and warm return hose 122 extending to the opposite end of the mold half. Specifically, cooling fluid may be provided from cold supply hose 110, through multi-manifold 112, and to three cold supply hoses 114, which may be connected to three cooling tubes 116 configured to cool a corrugation 30. At an adjacent corrugation, cooling fluid may flow in the opposite direction through three cooling tubes 116 (as supplied from a cold supply hose 110 at an opposite end of mold half 19). As the cooling fluid flows through cooling tubes 116 and collects heat energy from the mold material in which it is cast, the cooling fluid may increase in temperature. The cooling fluid may then flow through three warm return hoses 118 to multi-manifold 112, and to a warm return hose 122. The warm cooling fluid may exit mold half 19 through a warm fluid return 106 of moving manifold 102, and may then be drained, or cooled by a heat exchanger and/or refrigerant.

Figure 7:
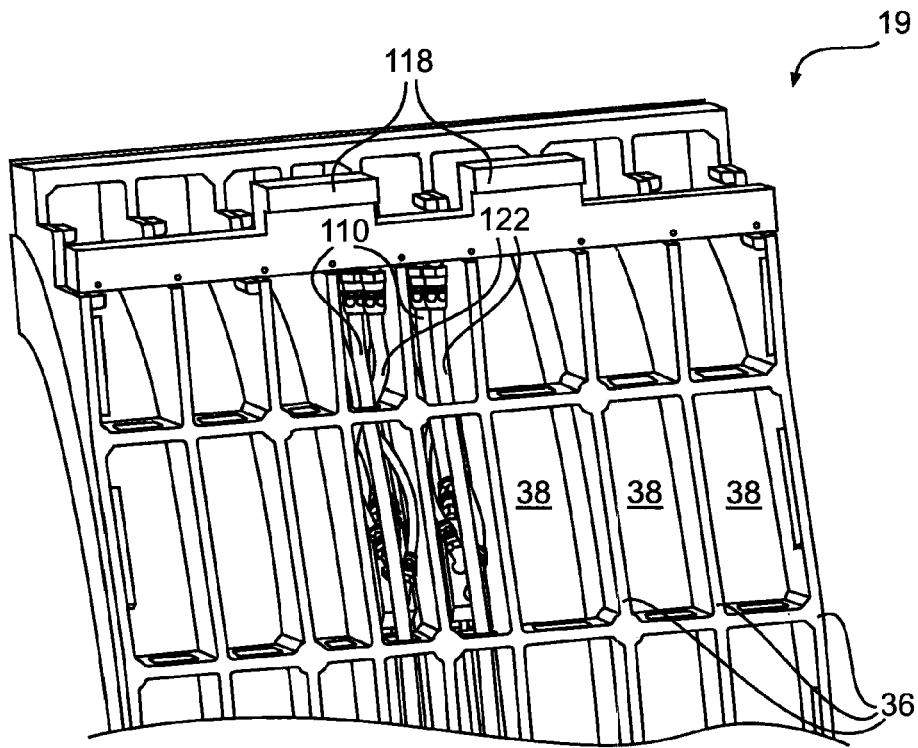
FIG. 7 is a partial, perspective view of an exemplary cooling system and moving mold half, consistent with embodiments of the present disclosure.
Figure 8:
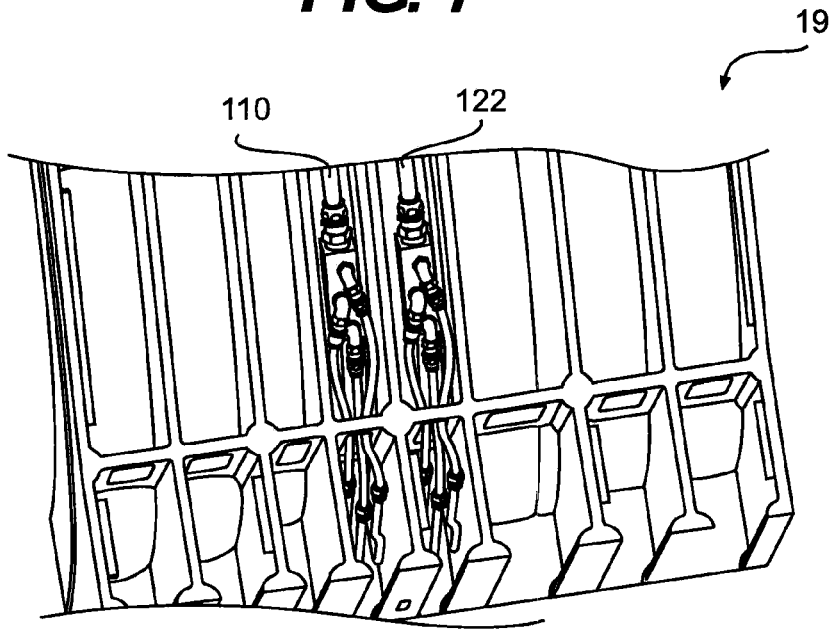
FIG. 8 is another partial, perspective view of an exemplary cooling system and moving mold half, consistent with embodiments of the present disclosure.

FIG. 7 illustrates a partial, perspective view of a mold half 19 having vertical webs 36 separating adjacent vacuum chambers 38. Mold half 19 may further include one or more quick-connects 118 and corresponding cold supply hoses 110 and warm return hoses 122. As described above, cold supply hoses 110 and warm return hoses 122 may be disposed inside vacuum chambers 38 and configured to communicate cooling fluid between quick-connects 118 and cooling tubes 116, which may be cast into the mold housing (and are therefore not visible in this perspective view). FIG. 8 illustrates an alternative partial, perspective view of an opposite end of the exemplary mold half 19, cold supply hose 110, and warm return hose 122.

The presently disclosed moving mold system 10 and cooling system 100 may be particularly advantageous in improving the continuous extrusion blow molding processes used in the manufacture of corrugated polymer pipe. For example, the cooling system 100 may be useful in cooling the corrugated layer of a co-extruded, dual-wall, polyethylene or polypropylene pipe after it has been blow-molded but before it has been released form the mold. However, the embodiments described herein may be applicable to virtually any extruded and blow molded polyolefin product.

In operation, the exemplary disclosed moving mold system 10 and cooling system 100 may be used in a method of cooling continuously extruded and blow molded products. The method may include extruding a parison from a die head, blowing an internal diameter of the parison with pressurized air, and drawing a vacuum on an external diameter of the parison, so as to urge the parison into the mold. The method may further include inserting a cooling fluid supply into a connector of the mold; flowing a cooling fluid through a passageway cast into the mold; and removing the cooling fluid from the mold through the connector after the cooling fluid has absorbed at least some amount of heat energy from the mold. The method may further include removing the cooling fluid supply from the connector of the mold after the cooling fluid has absorbed heat energy from the mold. The method may further include conveying the mold and the cooling fluid supply along a direction of manufacture while flowing the cooling fluid through the passageway. The method may further include selectively drawing a vacuum through passageways disposed in the mold.

In one exemplary embodiment, the cooling fluid may be water, and each mold half may be configured to circulate approximately 2 gallons of water at a time. The water may enter the mold half at approximately 150-160 degrees F. Because the polymer may be approximately 400-450 degrees F. when it enters the mold, the relatively cooler water may absorb heat energy from the polymer and the mold in which it is being formed. For example, in one embodiment, the cooler water may reduce the temperature of the polymer to approximately 200 degrees F. before the polymer exits the mold.

It will be appreciated by one of skill in the art that the presently disclosed systems and methods may be applicable to other types of blow molds, thermoforming molds, rotational molds, injection molds, or any other device in which a hot, molten product is desired to be cooled at a certain rate.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of providing a mold cooling system for cooling a polymer product shaped in a mold, the method comprising:
   casting a passageway into a mold housing having an inner mold surface that defines a cavity, and a plurality of outer members that define a plurality of vacuum chambers disposed in communication with the cavity, wherein the mold surface defines a plurality of corrugations for forming a polymer parison into a corrugated pipe;
   affixing one or more sealing members to the outer members so as to close off the plurality of vacuum chambers to enable a vacuum to be drawn on polymer extruded into the cavity;
   providing the mold housing with a connector configured to receive a cooling fluid supply and a cooling fluid return of a moving manifold; and
   positioning the mold housing in sliding engagement with the moving manifold;
   wherein the passageway connects the cooling fluid supply and the cooling fluid return when the moving manifold is received in the connector;
   wherein the passageway includes a plurality of cooling tubes cast into the mold housing between adjacent corrugations.

2. The method of claim 1, wherein the passageway includes at least three cooling tubes cast into the mold housing around one of the corrugations.

3. The method of claim 1, wherein the cooling tubes are made from stainless steel tubing and the mold housing is made from an aluminum or aluminum alloy.

4. The method of claim 1, wherein the cooling tubes are cast into the mold housing at locations and orientations selected to improve cooling of polymer molded into the cavity of the mold housing.

5. The method of claim 1, wherein the cooling tubes are positioned in a casting form, into which the mold housing is formed by casting molten metal.

6. The method of claim 1, wherein:
the mold housing is a semi-circular mold configured to mate with another semi-circular mold; and
the semi-circular molds are configured to move along a mold track away from a hot extruder.

7. The method of claim 1, further comprising conveying the mold housing and the cooling fluid supply along a direction of manufacture while flowing the cooling fluid through the passageway.

8. A method of providing a mold cooling system for cooling a polymer product shaped in a mold, the method comprising:
casting a passageway into a first semi-circular mold configured to mate with a second semi-circular mold, the first semi-circular mold having a corrugated inner mold surface that defines a cavity, wherein the corrugated inner mold surface defines a plurality of corrugations for forming a polymer parison into a corrugated pipe, and wherein a plurality of web members are disposed between adjacent corrugations of the corrugated inner mold surface;
affixing one or more sealing members to the plurality of web members to define a plurality of vacuum chambers disposed in communication with the cavity for drawing a vacuum on polymer extruded into the cavity;
providing a mold housing with a connector configured to receive a cooling fluid supply and a cooling fluid return of a moving manifold; and
positioning the mold housing in sliding engagement with the moving manifold;
wherein the passageway connects the cooling fluid supply and the cooling fluid return when the moving manifold is received in the connector;
wherein the passageway includes a plurality of cooling tubes cast into the mold housing between adjacent corrugations.

9. The method of claim 8, wherein the passageway includes at least three cooling tubes cast into the mold housing around one of the corrugations.

10. The method of claim 8, wherein the cooling tubes are made from stainless steel tubing and the mold housing is made from an aluminum or aluminum alloy.

11. The method of claim 8, wherein the cooling tubes are cast into the mold housing at locations and orientations selected to improve cooling of polymer molded into the cavity of the mold housing.

12. The method of claim 8, wherein the cooling tubes are positioned in a casting form, into which the mold housing is formed by casting molten metal.

13. The method of claim 8, wherein:
the mold housing comprises a first semicircular mold configured to mate with a second semi-circular mold; and
the first and second semi-circular molds are configured to move along a mold track away from a hot extruder.

14. The method of claim 8, further comprising conveying the mold housing and the cooling fluid supply along a direction of manufacture while flowing the cooling fluid through the passageway.

* * * * *